United States Patent [19]
Kato et al.

[11] Patent Number: 4,731,686
[45] Date of Patent: Mar. 15, 1988

[54] MAGNETIC HEAD

[75] Inventors: Minoru Kato; Nobuaki Kaneko; Masahiro Yamamoto; Yutaka Hayashi, all of Chichibu, Japan

[73] Assignee: Canon Denshi Kabushiki Kaisha, Chichibu, Japan

[21] Appl. No.: 714,019

[22] Filed: Mar. 19, 1985

[30] Foreign Application Priority Data

Mar. 21, 1984 [JP] Japan .................................. 59-52211
Jan. 22, 1985 [JP] Japan .................................. 60-8532

[51] Int. Cl.⁴ ............................................. G11B 5/187
[52] U.S. Cl. ..................................... 360/122; 360/110
[58] Field of Search ........................ 360/122, 102–104, 360/110, 118, 121, 124, 128–129

[56] References Cited

U.S. PATENT DOCUMENTS 4,058,846 11/1977 Knutson et al. ..................... 360/121
4,263,630 4/1981 Pierson ................................ 360/104
4,555,740 12/1985 Jackson et al. .................. 360/125 X

OTHER PUBLICATIONS

Cheatham et al., "Magnetic Head Construction", *IBM TDB*, Jul. 1976, vol. 19, No. 2, p. 397.
Shew, "Increased Density Magnetic Recording", *IBM TDB*, Aug. 1959, vol. 2, No. 2, p. 35.

Primary Examiner—John H. Wolff
Assistant Examiner—David J. Severin
Attorney, Agent, or Firm—Spencer & Frank

[57] ABSTRACT

In a magnetic head having magnetic cores for performing recording and/or reproducing and erasing of information onto and/or from and from a magnetic recording medium and a slider for supporting the cores, a member for shielding the magnetic cores magnetically is provided in the slider. When accessing information by sandwiching a magnetic recording medium between the two opposing portions of a pair of the magnetic heads, crosstalk is reduced between the magnetic cores and thus recording and/or reproducing errors are prevented. The reliability of the magnetic head is improved.

18 Claims, 12 Drawing Figures

FIG. 1

PRIOR ART

FIG. 2

PRIOR ART

MAGNETIC HEAD

BACKGROUND OF THE INVENTION

1. Field of the Invention

The present invention relates to a magnetic head having a magnetic core and a slider for supporting the magnetic core, and more particularly to a magnetic head preferably used in a magnetic disc apparatus in which both sides of a flat circular magnetic recording medium; i.e., magnetic disc such as a floppy disc are supported by a pair of magnetic heads disposed to correspond to both sides of the magnetic disc in a manner that the magnetic heads perform recording and/or reproducing of information onto and/or from tracks on both different sides of the magnetic disc.

2. Description of the Prior Art

Known as this type of magnetic head is the catamaran type of magnetic head to be used in a magnetic disc apparatus for recording and/or reproducing information on and/or from a flexible magnetic recording medium, for instance, a magnetic disc such as a floppy disc.

A conventional arrangement of such a magnetic head will be explained with reference to FIGS. 1 and 2.

Figure 1:
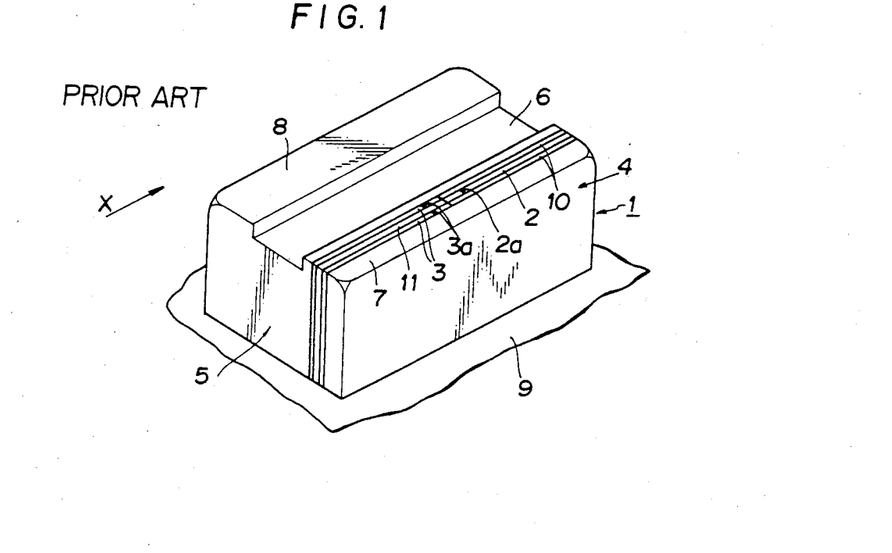
FIG. 1 is a perspective view showing an arrangement of main portions of a conventional magnetic head.

Reference numeral 9 in FIG. 1 denotes a resilient plate made of stainless steel or copper alloy which is fixed to the end portion of a supporting member mounted on a magnetic head carriage (not shown). A magnetic head 1 is mounted on this resilient plate 9. FIG. 1 shows only a portion of the magnetic head 1 which is on one side of the resilient plate 9 and which is confronted with the disc sliding surface, and the illustration and explanation of a portion mounted on the opposite side of the resilient plate 9 are omitted.

Reference numeral 2 in the arrangement of the magnetic head 1 denotes a recording and/or reproducing core in the form of a thin plate. A magnetic gap 2a is formed on the upper edge surface of the recording and/or reproducing core 2 which is confronted with the sliding surface. The recording and/or reproducing core 2 is sandwiched on both sides by reinforcing plates 10.

Furthermore, reference numerals 3 denote erasing cores in the form of a thin plate which have magnetic gaps 3a formed on the upper edge surfaces of the erasing cores 3 facing the sliding surface. A reinforcing plate 11 is sandwiched between the erasing cores 3.

The respective end edges of the erasing cores 3 are abutted against the end edges of the reinforcing plates 10 and are disposed in parallel with the recording and/or reproducing head 2. The end edge of the recording and/or reproducing core 2 is abutted against the end edge of the reinforcing plate 11.

Reference numerals 4 and 5 denote sliders formed from a non-magnetic material such as ceramic to support and reinforce both the cores 2 and 3. The sliders 4 and 5 ensure that both the cores 2 and 3 slide smoothly over the surface of the magnetic disc (not shown). These sliders 4 and 5 sandwich the reinforcing plates 10 on both sides of the recording and/or reproducing core 2 and the erasing cores 3.

The slider 4 is in the form of a rectangular thick plate having a sliding surface 7 in the same plane as the surfaces of the above-mentioned cores 2 and 3.

The other slider 5 is in the form of a block with a regular parallelepiped shape and having a greater width than the slider 4, and has a sliding surface 8 in the same plane as the surfaces of both the cores 2 and 3. A groove 6 is formed in this sliding surface 8 and is disposed on the side of the center a little toward the cores 2 and 3 in parallel with the cores 2 and 3. Stated another way, the slider 5 comprises a grooved surface 6 having lands definded by the sliding surfaces 7 and 8.

Further, the center of the groove 6 viewed from the direction indicated by the arrow is positioned in the center of the entire sliding surface of the magnetic head 1. Both of the cores 2 and 3 are disposed on one side of this central position (in this case, the right-hand side), so that the cores 2 and 3 on one side of a magnetic disc 12 are displaced from the cores 2 and 3 on the other side of the magnetic disc 12 by a track displacement A which is the distance between the positions of the same-numbered tracks on the respective sides of the magnetic disc 12, as illustrated in FIG. 2. Usually, the track displacement is equal to 4 or 8 track pitches.

The track displacement A is provided in order to prevent the generation of mutual interference, that is crosstalk, caused by leakage magnetic flux between the tracks corresponding to the recording and/or reproducing cores 2 and 2' on the magnetic heads 1 and 1' during recording and/or reproducing.

When recording and/or reproducing, the abovementioned magnetic head 1 and a magnetic head 1', having exactly the same structure as the magnetic head 1 and being inverted (since the magnetic head 1' has the same structure as the magnetic head 1, the reference numerals denoting common portions are distinguished by the addition of a prime ""), sandwich the upper and lower surfaces of the magnetic disc 12 while this magnetic disc 12 is rotated.

In this fashion, the magnetic gaps in the recording and/or reproducing cores 2 and 2' and in the erasing cores 3 and 3' of the magnetic heads 1 and 1' respectively trace tracks at different positions on both the upper and lower surfaces of the disc 12, so that recording and/or reproducing, or erasing of information is performed.

As magnetic disc apparatus for performing higher-density recording on compact magnetic discs have been developed in recent years, the above-mentioned track displacement A has become narrower as shown in Table 1 below.

TABLE 1

| | Track Density | Track Displacement |
|---|---|---|
| 5-inch discs | 96 TPI | 2.117 mm |
| 3-inch discs | 100 TPI | 2.032 mm |
| 3.5-inch discs | 135 TPI | 1.505 mm |

As shown in Table 1, the track displacement A in magnetic heads for use with 3.5-inch magnetic discs is particularly narrow.

As a result of this narrower track displacement, the above-mentioned crosstalk in this type of magnetic head is increased. For example, the level of crosstalk in magnetic heads for 5-inch floppy discs is 35 dB, but the level of crosstalk is increased to 25 dB in magnetic heads for 3.5-inch floppy discs.

Accordingly, there is a problem in conventional magnetic heads that recording and/or reproducing errors are likely to occur easily due to crosstalk between the magnetic cores corresponding to both sides of a magnetic disc.

Furthermore, there is another problem that this crosstalk impedes the making of compact magnetic discs and the realization of higher densities of recording and/or reproducing tracks and therefore it is difficult to provide a smallsized magnetic disc apparatus.

SUMMARY OF THE INVENTION

It is, therefore, an object of the present invention to provide a magnetic head which prevents recording and/or reproducing errors by reducing crosstalk between magnetic cores performing recording and/or reproduction on tracks in different positions on both sides of a magnetic recording medium, so as to provide a highly reliable magnetic head that performs recording and/or reproducing appropriately without such errors.

It is a further object of the present invention to provide a magnetic head which fits a compact magnetic disc, and facilitates a higher density of recording and/or reproducing tracks so as to permit a configuration of a compact magnetic disc apparatus.

In order to achieve these objects, in a first aspect of the present invention, a magnetic head comprises:

a magnetic core portion for recording and/or reproducing and erasing information, the magnetic core portion sliding on a magnetic recording medium;

a slider having a supporting member for supporting the magnetic core portion; and a shielding member provided in relation to the slider for shielding the magnetic core portion.

Here, the shielding member can be made from a material with a high permeability. The slider may have a sliding portion having a sliding surface disposed opposite to the magnetic recording medium. The shielding member can be in the form of a plate, and the shielding member can be so provided in the slider to shield magnetically the supporting member and the sliding portion from each other.

The opposing surface of the supporting member which is opposite to the magnetic recording member and the sliding surface of the sliding portion may be separated by a groove which is formed in the slider to face onto the magnetic recording medium, and the shielding member can be buried in the bottom surface of the groove. A second shielding member made from a material with a high conductivity can be disposed adjacent to the shielding member.

The opposing surface of the supporting member which is opposite to the magnetic recording member and the sliding surface of the sliding portion may be separated by a groove which is formed in the slider to face onto the magnetic recording medium, and the shielding member can be buried in the sliding surface in a manner that one side of the shielding member forms a side wall of the groove. Here, a third shielding member made from a material with a high conductivity can be disposed adjacent to the shielding member.

Further, the shielding member may have a surface sliding on the magnetic recording medium, and the slider can be in an integral form of the shielding member and the supporting member. A fourth shielding member made from a material having a high conductivity can be disposed between the shielding member and the supporting member.

In a second aspect of the present invention, a magnetic head comprises:

first and second magnetic core portions for recording and/or reproducing and erasing information, the first and second magnetic core portions sliding on first and second surfaces of a magnetic recording medium, respectively;

first and second sliders having, respectively:

first and second supporting members for supporting the first and second magnetic core portions, respectively; and first and second sandwiching members having sliding surfaces opposite to the magnetic recording medium, and opposing to each other so that the second and first magnetic core portions sandwich the magnetic recording medium; and fifth and sixth shielding members provided in the first and second sliders, respectively, to shield the first and second magnetic core portions from each other magnetically.

Here, the fifth and sixth shielding members may be made from a material with a high permeability. Each of the fifth and sixth shielding members can be in the form of a plate, and the fifth and sixth shielding members can be provided in the first and second sliders so as to shield magnetically the first and second supporting members and the second and first sandwiching members from each other, respectively.

The opposing surfaces of the first and second supporting members opposite to the magnetic recording member and the sliding surfaces of the first and second sandwiching members may be separated by first and second grooves formed in the first and second sliders, respectively, to face onto the magnetic recording medium, and the fifth and sixth shielding members can be buried in the bottom surface of the first and second grooves, respectively. Here, seventh and eighth shielding members made from a material with a high conductivity can be disposed adjacent to the fifth and sixth shielding members, respectively.

The opposing surfaces of the first and second supporting members opposite to the magnetic recording member and the sliding surface of the first and second sandwiching members can be separated by first and second grooves formed in the first and second sliders, respectively to face onto the magnetic recording medium, and the fifth and sixth shielding members can be buried in the sliding surface in a manner that respective one sides of the shielding members form respective side walls of the first and second grooves. Here, ninth and tenth shielding members made from a material with a high conductivity can be disposed adjacent to the fifth and sixth shielding members, respectively. The fifth and sixth shielding members may have sliding surfaces, and the first and second sliders can be in an integral form of the fifth and sixth shielding members and the first and second supporting members, respectively. Here, eleventh and twelfth shielding members made from a material with a high conductivity can be disposed between the fifth and sixth shielding members and the first and second supporting members, respectively.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 2:
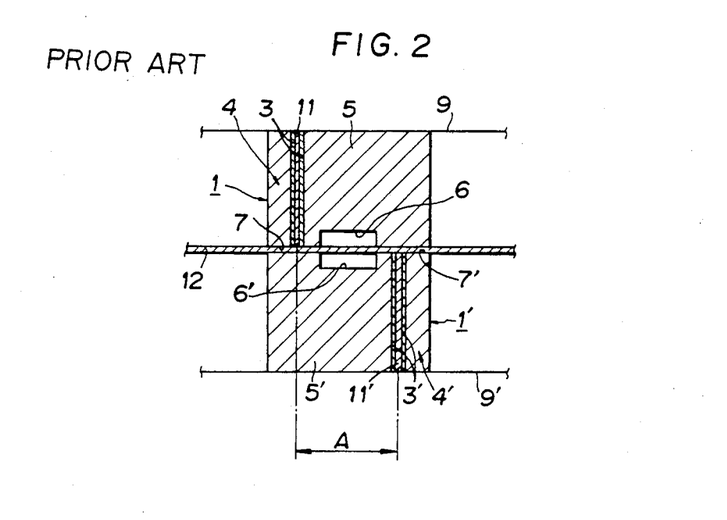
FIG. 2 is a side view used to explain a recording and/or reproducing operation by the magnetic head shown in FIG. 1.

FIGS. 3-12 show embodiments of a magnetic head in accordance with the present invention applied to a catamaran type of magnetic head, and portions of these drawings which correspond to portions in FIGS. 1 and 2 are denoted by the same reference numerals and are not explained further.

Figure 3:
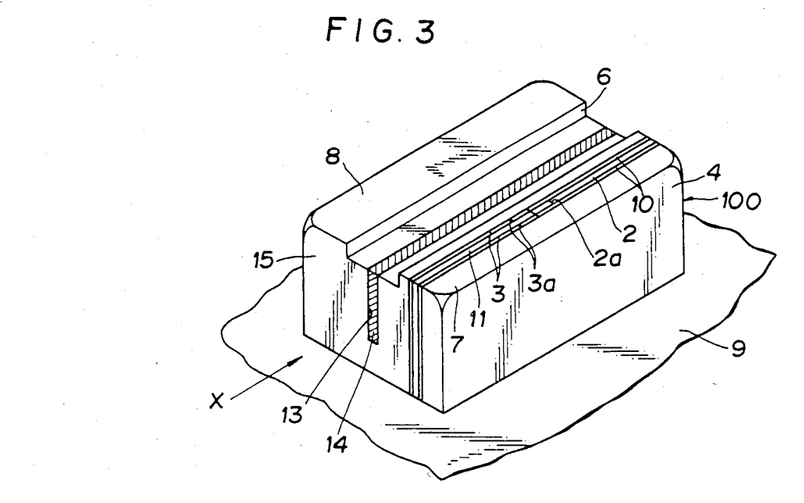
FIG. 3 is a perspective view showing an arrangement of main portions of a magnetic head in a first embodiment of the present invention.

FIG. 3 shows an arrangement of a magnetic head 100 in a first embodiment of the present invention. As shown in this drawing, in this first embodiment, at a center of the groove 6 in a slider 15 viewed along the direction X indicated by an arrow, a shielding plate groove 13 is recessed substantially perpendicularly from the bottom of the groove 6. A shielding plate 14 made from a magnetic material with a high permeability such as permalloy is fitted into this shielding plate groove 13. Other portions of this arrangement are the same as in the conventional magnetic head described above.

Figure 4:
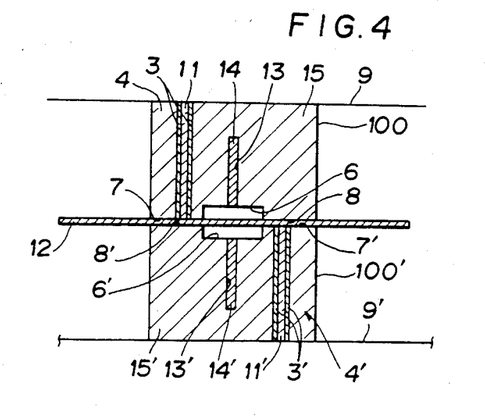
FIG. 4 is a side view used to explain a recording and/or reproducing operation by the magnetic head shown in FIG. 3.

When recording and/or reproducing with the above arrangement as shown in FIG. 4, the magnetic head 100 and a magnetic head 100' having exactly the same construction sandwich both the upper and lower surface of the magnetic disc 12 and the magnetic disc 12 is rotated to perform recording and/or reproducing, or erasing of information in the same manner as described above.

However, when recording and/or reproducing as above with this embodiment, the shielding plates 14 and 14' interposed between the tracks corresponding to the recording and/or reproducing cores 2 and 2' absorb the leakage magnetic flux of both the cores 2 and 2' and both the cores 2 and 2' shielded magnetically from each other, so as to prevent crosstalk between both the cores 2 and 2'.

When a crosstalk of a magnetic head for a 3.5-inch floppy disc constructed according to the above embodiment was measured, a minimum level of the crosstalk was 35 dB, which is substantially equivalent to a value in case of the conventional magnetic head used for a 5-inch floppy disc.

Figure 5:
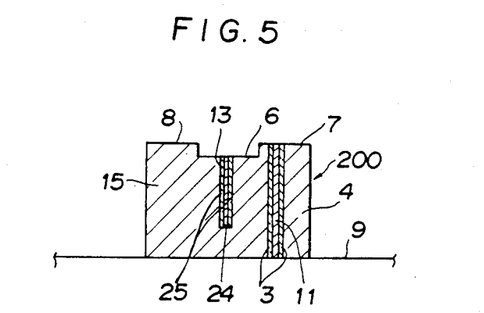
FIG. 5 is a side view showing an arrangement of main portions of a magnetic head in a second embodiment of the present invention.

FIG. 5 shows an arrangement of a magnetic head 200 in a second embodiment of the present invention.

As shown in FIG. 5, in this embodiment, in the shielding plate groove 13 on the slider 15, a shielding plate 24 of the same material as the shielding plate 14 in the first embodiment described above is sandwiched between shielding plates 25 made from a material with a high conductivity such as copper, copper alloy or aluminum in the groove 13.

When recording and/or reproducing with this arrangement, the shielding plate 24 absorbs leakage magnetic flux, so that an eddy current is produced in the shielding plates 25 and is converted into heat, so that the absorbed magnetic energy is dispersed in the form of heat. As a result, the magnetic shield effect is higher than in the first embodiment, and crosstalk is further suppressed.

Figure 6:
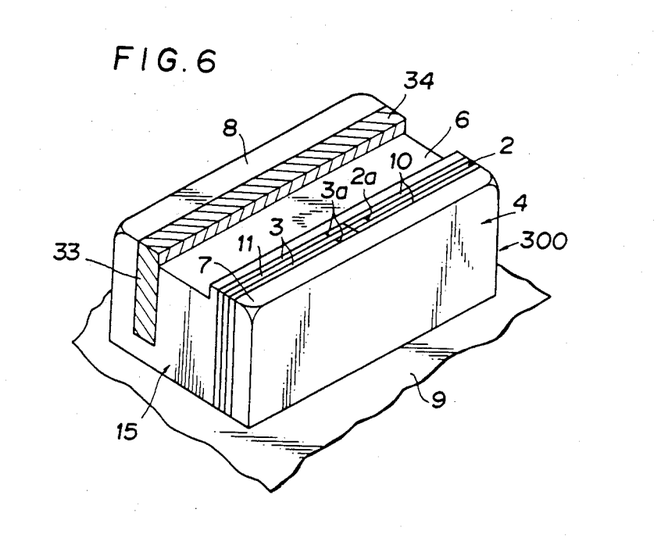
FIG. 6 is a perspective view showing an arrangement of main portions of a magnetic head in a third embodiment of the present invention.
Figure 7:
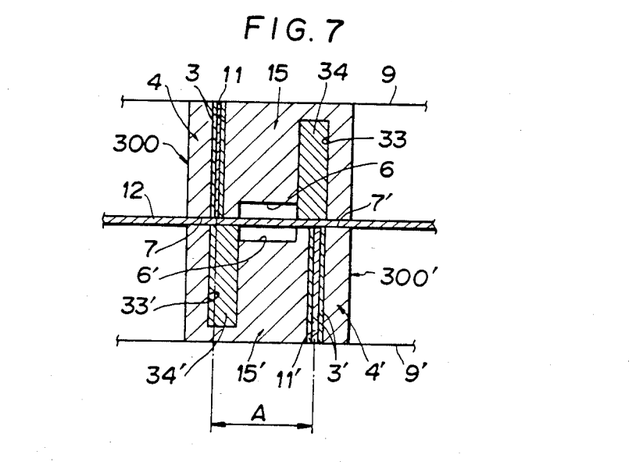
FIG. 7 is a side view used to explain a recording and/or reproducing operation by the magnetic head shown in FIG. 6.

FIGS. 6 and 7 show a magnetic head 300 of a third embodiment of the present invention. In the arrangement of this embodiment, a groove 33 is recessed perpendicularly from the sliding surface 8 of the slider 15 on one side of the groove 6 opposite to both the cores 2 and 3, that is on a side portion of the sliding surface 8 which is opposite to the cores 2' and 3' on the other side of the magnetic disc 12. A shielding plate 34 made from a high permeability material such as ferrite is fitted into this groove 33.

The upper surface of this high-permeability shielding plate 34 is in the same plane as the upper surface of the slider 15, that is the sliding surface 8.

When recording and/or reproducing in this embodiment, the recording and/or reproducing cores 2 and 2' sandwich the magnetic disc 12 and are in positions opposite to the high-permeability shielding plates 34 and 34', so that the leakage magnetic fluxes from both the cores 2 and 2' are absorbed and both the cores 2 and 2' are shielded magnetically from each other. In this manner, crosstalk is prevented between both the cores 2 and 2'.

Figure 8:
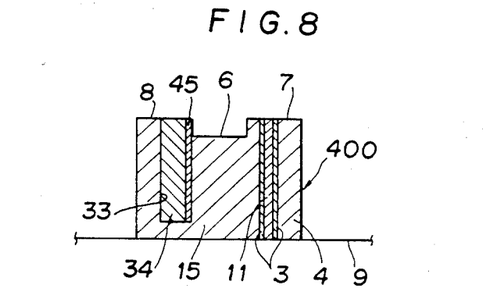
FIG. 8 is a side view showing main portions of a magnetic head in a fourth embodiment of the present invention.

FIG. 8 shows a magnetic head 400 as a fourth embodiment of the present invention. Here, the shielding plate 34 with a high permeability and a second shielding plate 45 with a high conductivity are sandwiched to be fitted into the groove 33 in a manner that both the shielding plates 34 and 45 are disposed in the groove 33 on the side of the sliding surface 8, with the second shielding plate 45 facing on the groove 6. The shielding plate 34 absorbs leakage magnetic flux, and the absorbed magnetic energy is dispersed by the shielding plate 45 adjacent to the shielding plate 34.

In these first to fourth embodiments, it is ensured that crosstalk is reduced. In addition, the magnetic head can be obtained with a simple slider assembly.

Figure 9:
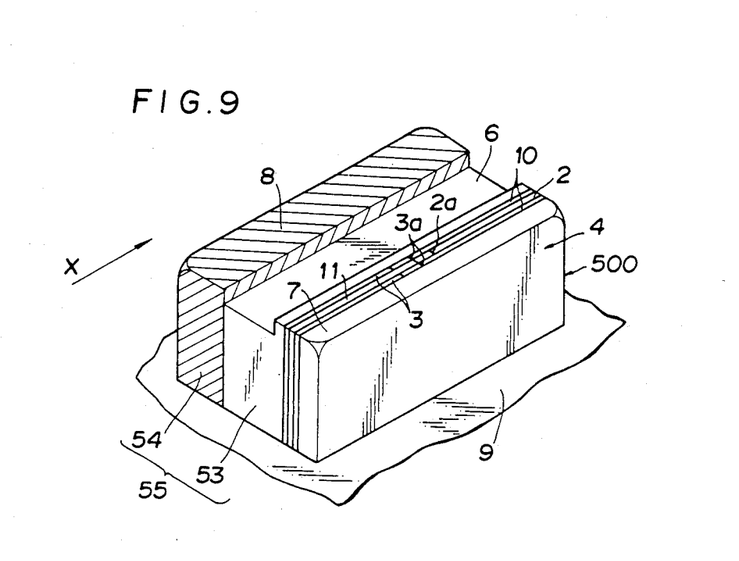
FIG. 9 is a perspective view showing main portions of a magnetic head in a fifth embodiment of the present invention.
Figure 10:
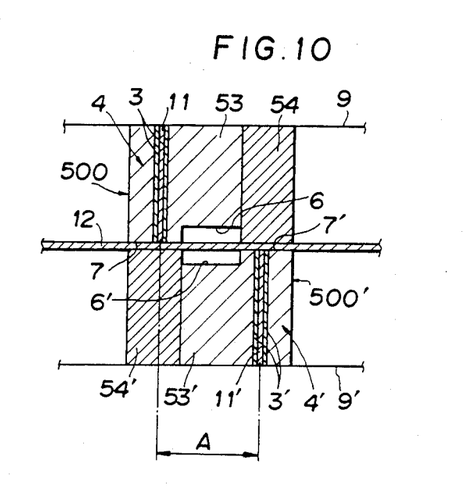
FIG. 10 is a side view used to explain a recording and/or reproducing operation by the magnetic head shown in FIG. 9.

Further, while in these embodiments, the groove 13 or 33 is formed in the solid slider 15 of non-magnetic material, and the shielding plate 14, 24 or 34 of a high-permeability material, or a combination of the shielding plate 34 of a high-permeability material and the shielding plate 45 of a high-conductivity material are fitted into this groove 13 or 33 to construct the slider 15 having the sliding surface 8, a separated non-magnetic member may be sandwiched with a shielding plate of a high-permeability material or with the above-mentioned combination of the shielding plate having a high permeability and the shielding plate having a high conductivity, as shown in FIGS. 9 and 10.

FIGS. 9 and 10 show a magnetic head 500 of a fifth embodiment of the present invention. In this embodiment, a slider 55 is not formed entirely from the same material. As shown in FIG. 9, the slider 55 is formed by sandwiching a block member 53 which is made from a non-magnetic material like the slider 15 in the first to fourth embodiments and has the groove 6 and the portion relating to the sliding surface 7 and a thick plate member 54 relating to the sliding surface 8 which is made from a high-permeability material such as ferrite. The plate member 54 is illustrated as a hatched portion in FIG. 9.

When recording and/or reproducing with the fifth embodiment arranged as just described, as shown in FIG. 10, the magnetic heads 500 and 500' having the same structure sandwich both the upper and lower sides of the magnetic disc 12. As the disc 12 rotates, the recording and/or reproducing, or erasing of information is performed as in the former embodiments.

In this fifth embodiment, when recording and/or reproducing as described above, each of the recording and/or reproducing cores 2 and 2' sandwiches the magnetic disc 12 in a manner such that the high-permeability plate members 54 and 54' are opposite to the cores 2' and 2, respectively, so that the leakage magnetic fluxes of both the cores 2 and 2' are absorbed. In this manner, both the cores 2 and 2' are shielded magnetically from each other and accordingly crosstalk between both the cores 2 and 2' is prevented.

Figure 11:
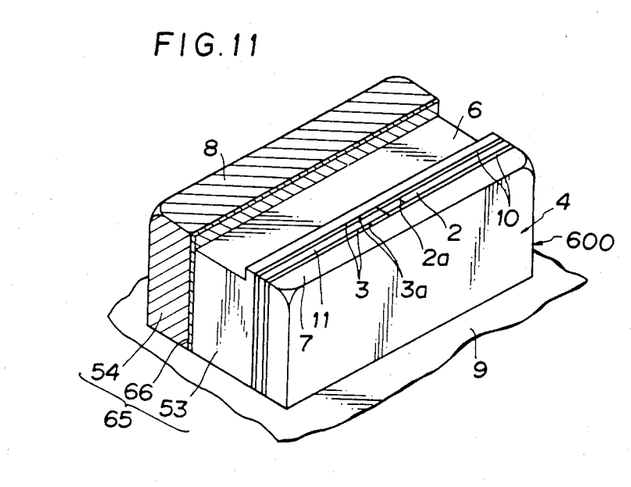
FIG. 11 is a perspective view showing main portions of a magnetic head in a sixth embodiment of the present invention.
Figure 12:
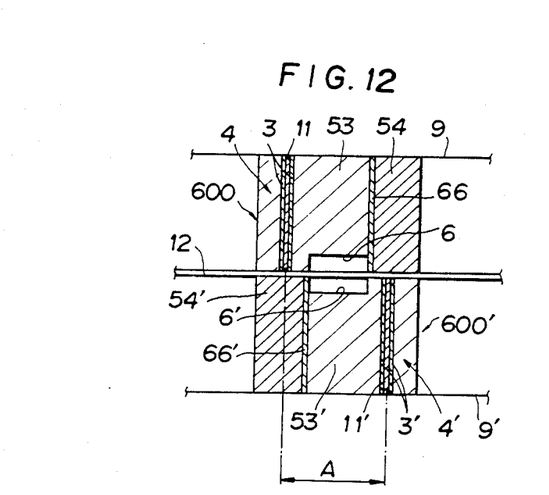
FIG. 12 is a side view used to explain a recording and/or reproducing operation by the magnetic head shown in FIG. 11.

FIGS. 11 and 12 show a magnetic head 600 of a sixth embodiment of the present invention. In this sixth embodiment, a slider 65 has a shielding plate 66 sandwiched between the high-permeability plate member 54 and the block member 53.

This shielding plate 66 may be in the form of a flat shape made from a high-conductivity material such as copper, copper alloy or aluminum in the same way as the shielding plate 25 in the second embodiment, or the shielding plate 45 in the fourth embodiment.

In this arrangement, when recording and/or reproducing, an eddy current is generated in the shielding plate 66 when the high-permeability plate member 54 absorbs the leakage magnetic flux of the recording and/or reproducing core 2. This absorbed magnetic energy is converted into heat and is released so that the shield effect is further improved and crosstalk is further suppressed than in the first embodiment.

While in these fifth and sixth embodiments, the members 54 and 66 have a depth as deep as the distance between the sliding surface 8 and the resilient plate 9, the depth of these members 54 and 66 from the sliding surface 8 can be determined appropriately to be less than the depth, as a matter of course.

Furthermore, the present invention is not limited to catamaran type of magnetic heads as described above, and can be applied to various kinds of magnetic heads having an arrangement in which a pair of magnetic heads, each having a magnetic core and a slider supporting the magnetic core, sandwich a magnetic recording medium, so that the magnetic heads perform recording and/or reproducing of information on different tracks on both sides of this medium.

As clear from the above explanation, in the present invention, the slider for supporting the magnetic core has a member that magnetically shields the magnetic core, so that crosstalk between the magnetic cores is well reduced and the generation of errors is prevented when recording and/or reproducing. Accordingly, the magnetic head according to the present invention is highly reliable.

Furthermore, the magnetic head according to the present invention contributes to the provision of higher densities of recording and/or reproducing and promotes the making of magnetic discs in compact form, so that the present invention advantageously contributes to the realization of a compact magnetic reproducing apparatus of the magnetic head type.

What is claimed is:

1. A pair of magnetic heads for use with a recording medium having first and second opposing surfaces, comprising
   first and second sliders each having a surface adapted for sliding on the first and second surfaces respectively of said recording medium, the surface of each of said sliders having first and second lands separated by a groove, the first and second lands of said first slider being opposite the second and first lands of said second slider, respectively;
   first and second magnetic cores embedded in the first lands respectively of each of said first and second sliders and being adapted to slide on the first and second surfaces of said recording medium, said first and second magnetic cores extending in a direction substantially perpendicular to the surfaces of said sliders and being spaced in a direction parallel to the surface of said sliders by a predetermined track displacement distance; and
   first and second magnetic shielding members embedded in said first and second sliders respectively, said first and second shielding members extending in a direction substantially parallel to said first and second magnetic cores, being positioned therebetween, and being substantially coextensive therewith whereby said shielding members magnetically shield said first and second magnetic cores from each other.

2. A pair of magnetic heads as claimed in claim 1, wherein said shielding members are made from a material having a high permeability.

3. A pair of magnetic heads as claimed in claim 2 which further comprises supporting members for supporting said first and second magnetic cores embedded within said first and second sliders, and wherein said shielding members are in the form of plates positioned within said sliders to shield magnetically the supporting members supporting said first and second magnetic cores from each other.

4. A pair of magnetic heads as claimed in claim 3, wherein said shielding members extend from the surfaces of said grooves in a direction substantially perpendicular thereto.

5. A pair of magnetic heads as claimed in claim 4, wherein a further shielding member made from a material with a high conductivity is disposed adjacent to each of said first and second shielding members, said further shielding members converting leakage magnetic flux emanating from said first and second shielding members to heat.

6. A pair of magnetic heads as claimed in claim 3, wherein said shielding members are positioned within said sliders in a manner such that one side of each of said shielding members forms a side wall of said groove between said lands.

7. A pair of magnetic heads as claimed in claim 6, wherein a further shielding member made from a material with a high conductivity is disposed adjacent to each of said first and second shielding members, said further shielding members converting leakage magnetic flux emanating from said first and second shielding members to heat.

8. A pair of magnetic heads as claimed in claim 6, wherein said shielding members have surfaces for sliding on said recording medium, said sliders being integral with said shielding members and said supporting members.

9. A pair of magnetic heads as claimed in claim 8, wherein a further shielding member made from a material having a high conductivity is disposed between each of said first and second shielding members and said supporting member, said further shielding member being made from a material having a high permeability and converting leakage magnetic flux emanating from said first and second shielding members to heat.

10. A pair of magnetic heads for use with a recording medium having first and second opposing surfaces, comprising first and second sliders each having a surface adapted for sliding on the first and second surfaces respectively of said recording medium, the surface of each of said sliders having first and second lands separated by a groove, the first and second lands of said first slider being opposite the second and first lands of said second slider, respectively;

first and second magnetic cores embedded in the first lands respectively of each of said first and second sliders and being adapted to slide on the first and second surfaces of said recording medium, said first and second magnetic cores extending in a direction substantially perpendicular to the surfaces of said sliders and being spaced in a direction parallel to the surface of said sliders by a predetermined track displacement distance;

first and second supporting members embedded in said first lands for supporting said first and second magnetic cores; and first and second magnetic shielding members embedded in said first and second sliders respectively, said first and second shielding members extending in a direction substantially parallel to said first and second magnetic cores, being positioned therebetween, and being substantially coextensive therewith whereby said shielding members magnetically shield said first and second magnetic cores from each other.

11. A pair of magnetic heads as claimed in claim 10, wherein said first and second shielding members are made from a material with a high permeability.

12. A pair of magnetic heads as claimed in claim 11, wherein each of said first and second shielding members is in the form of a plate.

13. A pair of magnetic heads as claimed in claim 12, wherein said first and second shielding members extend from the surfaces of said first and second grooves in a direction substantially perpendicular to said bottom surfaces, respectively.

14. A pair of magnetic heads as claimed in claim 13, wherein third and fourth shielding members made from a material with a high conductivity are disposed adjacent to said first and second shielding members, respectively.

15. A pair of magnetic heads as claimed in claim 11, wherein said first and second shielding members are positioned within said first and second sliders in a manner such that respective sides of said shielding members form respective side walls of said first and second grooves between said lands.

16. A pair of magnetic heads as claimed in claim 15, wherein third and fourth shielding members made from a material with a high conductivity are disposed adjacent to said first and second shielding members, respectively.

17. A pair of magnetic heads as claimed in claim 15, wherein said first and second shielding members have sliding surfaces sliding on each side of said magnetic recording medium, said first and second sliders being integral with said first and second shielding members and said first and second supporting members, respectively.

18. A pair of magnetic heads as claimed in claim 17, wherein said third and fourth shielding members made from a material with a high conductivity are disposed between said first and second shielding members and said first and second supporting members, respectively.

* * * * *